United States Patent Office

Re. 26,164
Reissued Feb. 28, 1967

26,164

N,N'-BIS(α-SULFOALKYL)-ACTINOSPECTACINS AND PROCESS FOR THEIR PRODUCTION

Herman Hoeksema, Cooper Township, Kalamazoo County, Mich., assignor to The Upjohn Company, Kalamazoo, Mich., a corporation of Delaware No Drawing. Original No. 3,147,277, dated Sept. 1, 1964, Ser. No. 172,099, Feb. 9, 1962. Application for reissue May 7, 1965, Ser. No. 457,905
8 Claims. (Cl. 260—340.3)

Matter enclosed in heavy brackets [ ] appears in the original patent but forms no part of this reissue specification; matter printed in italics indicates the additions made by reissue.

This invention is related to novel compositions of matter and to a process for the preparation thereof, and is particularly directed to novel N,N'-bis(α-sulfoalkyl)actinospectacins and to a process for producing the same.

Actinospectacin is a biosynthetic product produced by the controlled fermentation of Streptomyces spectabilis. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961, Union of South Africa Patent No. 60/4,098 and Belgian Patent No. 596,175. Actinospectacin is characterized by an optical rotation $[\alpha]_D^{25}=-20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$). It was formerly thought that the molecular formula was $C_{14}H_{26}N_2O_7$, but it has since been shown that the molecular formula is $C_{14}H_{25}N_2O_7$.

It has now been found that novel compounds according to this invention are obtained by an α-sulfoalkalylation of actinospectacin. By this procedure, a lower α-sulfoalkyl group is introduced into the molecule, yielding an N,N'-bis(lower-α-sulfoalkyl)actinospectacin.

Subsequent to this invention, the structure of actinospectacin has been elucidated. The novel compounds of the invention, therefore, can now be represented by the following formula:

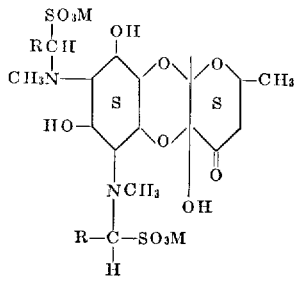

(I)

wherein R is selected from the group consisting of hydrogen and lower alkyl, e.g., methyl, ethyl, propyl, butyl, and the isomeric forms thereof and M is a cation, for example, hydrogen, alkali metal, alkaline earth metal, ammonia, magnesium, and the like.

The novel compounds of the invention, N,N'-bis(lower-α-sulfoalkyl)actinospectacins are obtained when actinospectacin is reacted with an alkali metal bisulfite and a lower alkanal, advantageously in the presence of a strongly basic anion exchange resin. (Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene cross-linked, if desired with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade names Dowex 2, Dowex 20, Amberlite IRA–400, Duolite A–102, and Permutit S–1.) For example, when sodium bisulfite and formaldehyde are reacted with a mixture of actinospectacin and Amberlite IRA–400 resin the novel compound N,N'-bis(sodium sulfomethyl)actinospectacin is obtained.

The novel compounds of the invention, N,N'-bis(α-sulfoalkyl)actinospectacin have activity against bacteria. N,N' - bis(sodium sulfomethyl)actinospectacin, for example, has the following antibacterial spectrum when tested on agar plates by applying 0.08 ml. of a 2 mg./ml. solution of N,N'-bis(sodium sulfomethyl)actinospectacin on a ½" disc:

| Microorganism: | Zone size, mm. |
|---|---|
| Bacillus subtilis | 25 |
| Staphylococcus auerus | 24 |
| Klebsiella pneumoniae | 26 |
| Sarcina lutea | 17 |
| Proteus vulgaris | 22 |
| Salmonella gallinarium | 19 |
| Proteus rettgeri | 22 |

Thus, the novel compounds of the invention, N,N'-bis-(lower α-sulfoalkyl)actinospectacin are useful to control the infection of silk worms caused by pathogenic cultures of B. subtilis; they can also be used to minimize or prevent odor in fish and fish crates caused by this organism. They are also useful as oil preservers, for example, as bacteriostatic agents to inhibit the growth of cultures of Proteus vulgaris that contaminate used cutting oils; they can also be used to prevent or minimize the liquefaction in packed yeast caused by this organism.

The following examples are illustrative of the process and products of the present invention, but are not to be construed as limiting.

EXAMPLE 1

N,N'-bis(sodium sulfomethyl)actinospectacin

A 3.5 g. quantity of actinospectacin free base in 35 ml. of water was stirred at 4° C. 1½ hrs. with 10 g. of a strongly basic anion exchange resin. (The anion exchange resin used for this purpose was obtained by chloromethylating by the procedure given on pages 88 and 97 of Kunin, Ion Exchange Resins, 2nd ed. (1958), John Wiley and Sons, Inc., polystyrene cross-linked with 5 percent of divinylbenzene prepared by the procedure given on page 84 of Kunin, supra, and quaternized with trimethylamine by the procedure given on page 97 of Kunin, supra.) To this mixture was added 1.5 ml. of 36% formaldehyde and 1.88 g. of sodium bisulfite. After 16 hrs. of storage at room temperature, the solution was stirred with carbon, filtered, and then freeze dried to yield 5.06 g. of N,N'-bis(sodium sulfomethyl)actinospectacin having a melting point of 245° C. and the following elemental analysis:

Calculated for $C_{16}H_{26}N_2O_{13}S_2Na_2 \cdot 3H_2O$: C, 31.1; H, 5.20; N, 4.52. Found: C, 30.41; H, 5.27; N, 4.55.

EXAMPLE 2

By substituting the formaldehyde in Example 1 by acetaldehyde, propionaldehyde, butyraldehyde, and valeraldehyde there is obtained the corresponding N,N'-bis-(sodium α-sulfoethyl)actinospectacin, N,N'-bis(sodium α-sulfopropyl)actinospectacin, N,N'-bis(sodium α-sulfobutyl)actinospectacin, N,N'-bis(sodium α-sulfoamyl)actinospectacin.

I claim:

1. N,N'-bis(α-sulfo lower alkyl)actinospectacin of formula

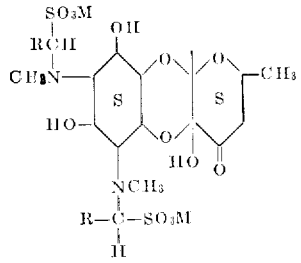

(1)

wherein R is *selected from the group consisting of hydrogen and* alkyl of not more than 4 carbon atoms and M is hydrogen.

2. N,N'-bis(α-alkali metal sulfo lower alkyl)actinospectacin [of Formula I] *having the formula*

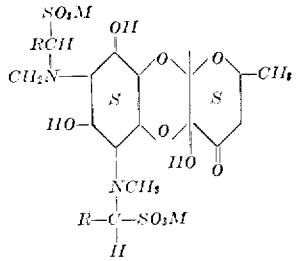

wherein R is *selected from the group consisting of hydrogen and* alkyl of not more than 4 carbon atoms and M is alkali metal.

3. N,N'-bis(α-sodium sulfo lower alkyl)actinospectacin [of Formula I] *having the formula as as shown in claim 2* wherein R is *selected from the group consisting of hydrogen and* alkyl of not more than 4 carbon atoms and M is sodium.

4. N,N'-bis(sulfomethyl)actinospectacin [of Formula I] *having the formula as shown as in claim 1* wherein R is [methyl] *hydrogen* and M is hydrogen.

5. N,N'-bis(alkali metal sulfomethyl)actinospectacin [of Formula I] *having the formula as shown in claim 2* wherein R is [methyl] *hydrogen* and M is alkali metal.

6. N,N'-bis(sodium sulfomethyl)actinospectacin [of Formula I] *having the formula as shown in claim 2* wherein R is [methyl] *hydrogen* and M is sodium.

7. A process which comprises reacting actinospectacin with an alkali metal bisulfite in the presence of a lower alkanal of not more than 5 carbon atoms, and a strongly basic anion exchange resin to produce N,N'-bis(α-alkali metal sulfo lower alkyl)actinospectacin.

8. A process which comprises reacting actinospectacin with sodium bisulfite in the presence of formaldehyde and a strongly basic anion exchange resin to produce N,N'-bis(sodium sulfomethyl)actinospectacin.

References Cited by the Examiner

The following references, cited by the Examiner, are of record in the patented file of this patent or the original patent.

Patnaik et al.: J. Indian Chemical Society, vol. 30, pp. 77–582 (1953).

Mahapatra et al.: J. Indian Chemical society, vol. 30, pp. 563–567 (1953).

Bergy et al: Antibiotics and Chemotherapy, vol. 11, pp. 661–664 (1961).

ALEX MAZEL, *Primary Examiner.*

J. H. TURNIPSEED, *Assistant Examiner.*